Sept. 17, 1968   T. B. SAUNDERS   3,401,960
ROD END FASTENER
Filed May 31, 1967

INVENTOR.
THOMAS B. SAUNDERS.
BY
WILSON, SETTLE & BATCHELDER.
ATT'YS.

3,401,960
ROD END FASTENER
Thomas B. Saunders, St. Clair Shores, Mich., assignor to Robin Products Company, Warren, Mich., a corporation of Michigan
Filed May 31, 1967, Ser. No. 642,518
1 Claim. (Cl. 287—20.5)

ABSTRACT OF THE DISCLOSURE

A rod end fastener for securing a rod to a support structure in a plane substantially parallel to a major surface of the support structure. The fastener is of integral molded, non-metallic material and includes a locking portion received through an aperture in the support structure and locked thereto by a portion of the rod. The fastener also has a clamping portion for locking the rod to the fastener.

Background of the invention

The present invention relates generally to fastening devices and more particularly to a fastener for securing a rod to an apertured support structure.

In the construction and assemblying of an automobile, various fastening devices are required for interconnecting various component parts as well as connecting many of the component parts to the main body of the automobile. One of these fastening devices is required for securing the end of the door lock knob to the locking mechanism of the door. Heretofore, this has been accomplished by a two part fastener with the parts being formed separately and subsequently joined prior to installation.

This type of securing device had several serious drawbacks. The primary problem with the prior art type of fastening device was that the parts were required to be made separately and subsequently assembled prior to being installed in the automobile. This procedure was not only very time consuming but was also quite costly in that two completely separate operations were required for forming the fastening device and a subsequent step was required to assemble the two parts. Of course, it is common knowledge that reducing the cost of even such a small item is a very important consideration for the auto industry.

Summary of the invention

Generally speaking, the present invention provides a very simple and efficient manner of securing a rod like member to a substantially parallel surface of a supporting structure. This is accomplished by providing a one piece molded plastic fastening device which has a first part or locking portion that is received in an aperture in the support structure and locked therein by a portion of the rod. Another part of the fastener clampingly receives another portion of the rod to lock the rod to the fastener.

The primary object of the present invention is to provide a fastening device which is simple and inexpensive to manufacture and which is easily installed in its operative position.

Another object is to provide a one piece fastener having a clamping portion which is adapted to releasably receive a portion of a rod and having a second portion that is releasably locked in an aperature of a support.

A further object is to provide a one piece fastener which is molded from a plastic material in a single operation.

Other objects and advantages of the invention will became more apparent from the following description taken in conjunction with the accompanying drawing, wherein.

Before explaining the present invention in detail, it is to be understood that the invention is not limited in its application to the details of construction and arrangement of parts illustrated in the accompanying drawing since the invention is capable of other embodiments and of being practiced or carried out in various ways. Also, it is to be understood that the phraseology and terminology employed herein is for purpose of description and not of limitation.

Figure 1:
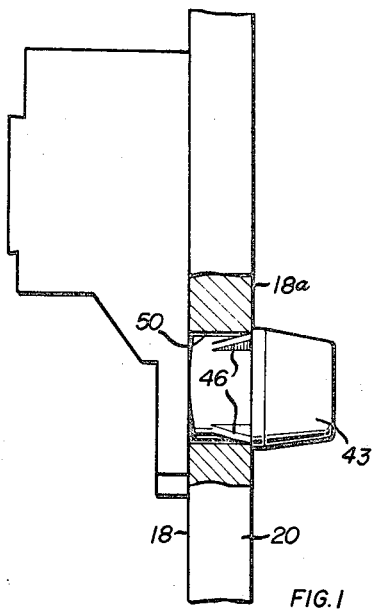
FIGURE 1 is a side elevational view, partially in section, showing the fastening device as it is received on a support before the insertion of the rod thereto.
Figure 3:
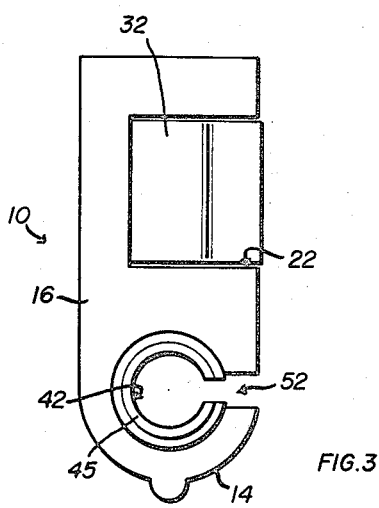
FIGURE 3 is a plan view of the fastening device shown in FIGURES 1 and 2.
Figure 5:
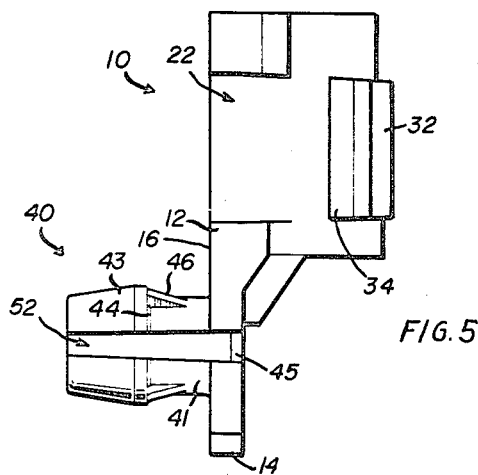
FIGURE 5 is a side elevation view of the molded one piece fastening device.

With particular reference to the drawing, FIGURES 3 and 5 show the fastener of the invention, generally designated at 10, comprising the integral member molded from a plastic material which is resilient and adapted to flow under moderate pressure. The fastener 10 has a body member or base 12 which, in the form shown, is generally rectangular along a major portion with one end being rounded at 14. The base 12 defines a flat surface 16 for engaging a first surface 18 of a support 20, as more clearly shown in FIGURE 1. The base 12 is slotted at 22, for a purpose which will become apparent hereinafter.

At one corner spaced from the circular portion 14, the base has an integral upstanding portion or lug 24 defining a first camming surface 26 and a portion of an arcuate recess 28.

An integral vertically extending leg 30 is formed along a major portion of the length of the base or main body portion at an edge spaced from the edge having the lug 24. A resilient clamping member 32 is formed integral with the upper portion of the leg 30 intermediate the ends thereof and the clamping member 32, along with the leg 30, defines a major portion of the clamping means for a rod, as will be explained more fully hereinafter. The end of the clamping member 32 has a camming surface 34 which is engaged by a portion of a rod when the rod is inserted into recess 28 defined by the lug 24, the vertical leg 30 and the clamping member 32.

Adjacent the circular end portion 14 of the base member 12, the fastener 10 has a socket or locking means 40 depending from the surface 16 thereof. The locking means includes a substantially hollow or tubular member 41 having an opening 42 corresponding in cross-section to the rod 60. The peripheral surface of the tubular member or first fastener portion has an annular ring or enlargement 43 extending upwardly from the lower end thereof to define a locking shoulder 44 spaced below the surface 16 of the base 12. This locking shoulder 44 is adapted to engage a second surface 18a of the support 20.

A chamfer 45 is preferably provided at the upper end of the opening to guide the rod end portion into the opening.

The socket 40 also has a plurality of integrally molded ribs (FIGURE 1) 46 formed on the outer periphery thereof extending upwardly from the shoulder 44 defined by the enlargement 43. Each of the ribs is generally triangular shaped and the upper end merges with the peripheral surface of the tubular member at a point spaced slightly below the lower surface 16 of the base 12. The primary purpose of the ribs 46 is to define spaced surfaces which will engage the wall defining the aperture 50 in the support structure 20 when the entire fastener is desired to be removed from the aperture. These ribs 46 will also compensate for any small differences in the size of the aperture 50 or minor variations in thickness of the support 20. Although only two ribs have been shown, it is to be understood that the opposite side of the tubular member has two more ribs 46.

The tubular member socket 40 also has an axial slot 52 extending the entire length thereof with the slot also extending through the base, as more clearly shown in FIGURE 3. This will allow the socket portion to be slightly collapsed when being received in the aperture 50 so that the enlarged portion 43 may readily pass through the aperture and, upon being received below the surface of the support structure 20, will snap into proper place adjacent the support surface 18a.

Figure 2:
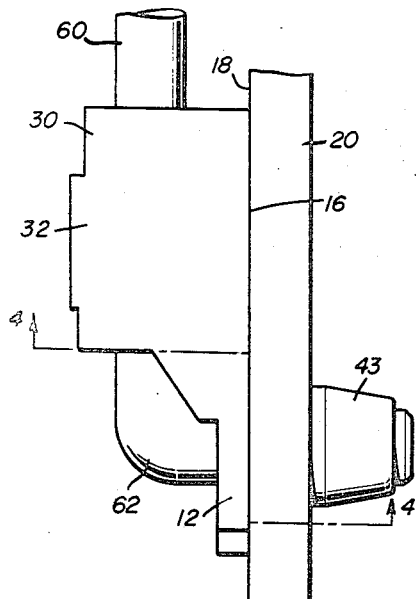
FIGURE 2 is a view similar to FIGURE 1 showing the rod in its installed position.
Figure 4:
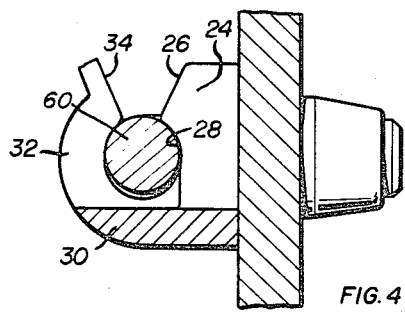
FIGURE 4 is a sectional view taken generally along lines 4—4 of FIGURE 2.

The manner of securing a rod 60 having a main portion and an angularly related end portion 62 is readily apparent from the above description. Thus, the socket portion 40 of the fastening device is forced through the aperture 50 in the manner shown in FIGURE 1. Thereafter, the end portion 62 of the rod 60 is forced into the opening 42 defined in the socket 40 to lock the fastener 10 to the support structure. This will result from locking shoulder 44 engaging the second surface 18a of the support 20. After the end portion 62 has been located in the socket opening, the main portion of rod 60 is rotated about the axis defined by the end portion 62 towards the clamping means. The peripheral surface of the rod 60 will engage the camming surfaces 26 and 34 to force or flex the clamping member 32 away from the base 12 a sufficient distance allowing the rod to be received into the recess 28. During this movement the clamping member 32 will of course be biased away from the recess 28 and, due to the elastic memory of the plastic material, the clamping member will snap back to the original position to yieldably lock the main portion of the rod in the recess 28 when it is in the final position shown in FIGURES 2 and 4.

Of course, if at any future time it is desirable to disassemble the entire structure, this can readily be accomplished by rotating the main portion of the rod 60 about the axis defined by the end portion 62 to release the main rod portion from the recess 28 and clamping member 32. Thereafter, the rod end portion may be removed from the opening 42 and the fastener or clip 10 removed from the aperture 50.

Thus, it will be seen that the fastener disclosed herein incorporates at least two important features. Namely the entire fastener can be molded in a single operation which will result in a one piece integral structure of non-metallic material which will not be subject to rust or corrosion. Also, the two parts connected by the fastener can readily be installed with a minimum amount of time or effort and can likewise be disassembled at any subsequent time if required.

It will be understood that the invention is not to be limited to the exact instruction shown and described, but that various changes and modifications may be made without departing from the spirit of the invention as defined by the following claim.

I claim:
1. An integral, molded fastening device for securing a rod having a main portion and an angularly related end portion to a support having an aperture therein, comprising a base having a substantially rectangular contacting surface engageable with one side of said support, a socket depending from said contacting surface, said socket having an outer surface engageable with one side of said support, said socket having an outer surface adjacent said contacting surface corresponding substantially to the size of the aperture in said support, an enlarged portion spaced from said contacting surface and engageable with an opposed side of said support, radially spaced ribs on said outer surface defining an extension of the peripheral surface of said enlarged portion and adapted to engage the wall defining said aperture for centering said socket and locking said socket in said aperture, said ribs decreasing in height from said enlarged portion toward said contacting surface and merging with said outer surface below said contacting surface, means defining a bore through said base and said socket and having a diameter substantially equal to said rod diameter, means defining a slot extending the length of said socket and through said base so that said socket may be collapsed sufficiently during insertion of said socket into said aperture to allow said enlarged portion to pass through the aperture, an arm extending above said base and spaced axially from said base, a clamping member for releasably receiving said main portion of said rod.

References Cited

UNITED STATES PATENTS

| | | | |
|---|---|---|---|
| 3,007,725 | 11/1961 | Becker et al. | 287—20.5 |
| 3,122,386 | 2/1964 | Pearson | 287—93 |
| 3,164,054 | 1/1965 | Biesecker | 287—93 |
| 3,231,300 | 1/1966 | Moroney | 287—93 |
| 3,232,651 | 2/1966 | Becker | 287—93 |
| 3,236,549 | 2/1966 | Phinney | 287—20.5 |
| 3,233,930 | 2/1966 | Becker | 287—93 |

CARL W. TOMLIN, *Primary Examiner.*

W. L. SHEDD, *Assistant Examiner.*